May 8, 1951 E. J. DUZY 2,552,036
CENTRIFUGAL GUIDED SPEED RESPONSIVE DEVICE
Filed Sept. 18, 1948

E. J. Duzy
INVENTOR.

BY

Patented May 8, 1951

2,552,036

UNITED STATES PATENT OFFICE 2,552,036

CENTRIFUGAL GUIDED SPEED RESPONSIVE DEVICE

Edward J. Duzy, Detroit, Mich., assignor to George M. Holley and Earl Holley

Application September 18, 1948, Serial No. 49,931

2 Claims. (Cl. 264—17)

The object of this invention is to improve the wear characteristics of the rotating weights and cage in a centrifugal governor of the type in which the centrifugal force of the weights move the cage.

Rotating weights, usually balls, wear out in a remarkably short time and the cage has an equally short life and it is absolutely imperative that this life be prolonged.

Figure 1:
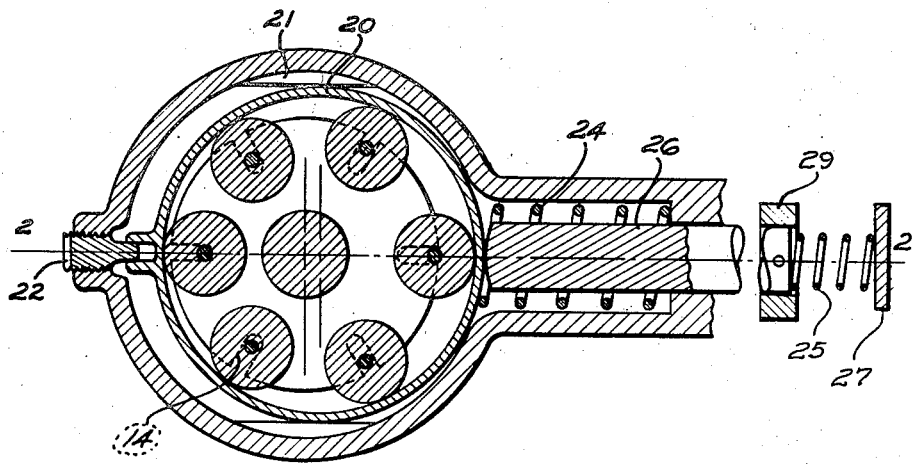
Fig. 1 shows a cross-sectional plan view of the preferred form of my invention, on plane 1—1 of Fig. 2.

In the figures, 10 is a driving shaft, 12 is the cage consisting of two slotted discs spaced apart but integral with the shaft 10, 14 is one of the six slots in the cage 12.

16 is one of the six cylindrical weights which has a pivot 18 which slides in one of the slots 14. 20 is a non-rotating, but slidable cylindrical cage inside which the rolling weights 16 roll when the shaft 10 rotates.

A pin 22 adjusts the initial eccentricity of the ring 20, (with reference to the shaft 10) and hence the eccentricity of the rolling weights 16 relative to the driving shaft 10. A spring 24 pushes the ring 20 against the end of the pin 22 and opposes the centrifugal force of the rotating rollers 16. 26 is a central control rod which engages with the outside of the non-rotating ring 20 and hence transmits the centrifugal force minus the force of the spring 24 which opposes the centrifugal force.

A second spring 25 and a lever 27 serves as a manual control of the speed at which the governor responds to the centrifugal force of the weights 16. 29 is the element to control the speed of the prime mover which this governor controls.

Operation

At low and increasing speeds the rotating weights 16 gradually increase their centrifugal effect and travel out in slots 14 so as to press against the ring 20.

Eventually the resultant of the vector sum of the centrifugal forces of all the rotating weights overcomes the force exerted by the springs 24 and 25, at that moment the control element 26 begins to move to the right. At that moment the eccentricity of the ring 20 also increases. With an increase in eccentricity the centrifugal force of the rotating weights 16 also increases, hence, there is a rapid response to an increase in speed and the governor is thus able to limit the speed of the governed mechanism by the motion of the element 26.

Figure 2:
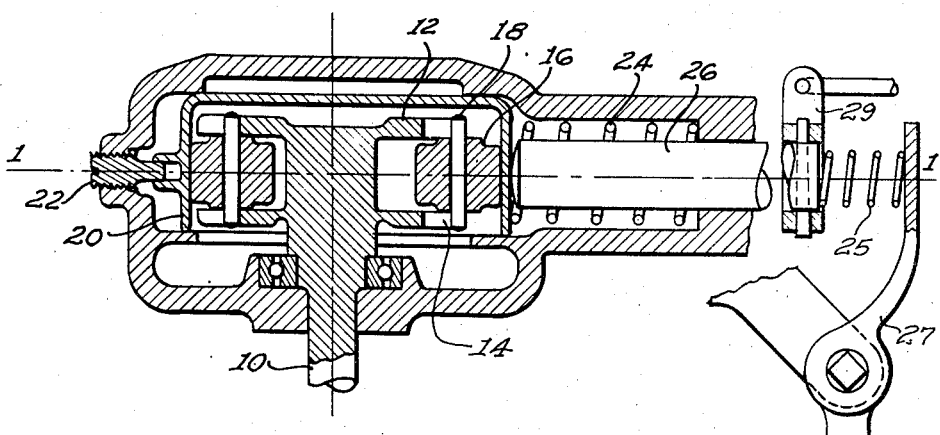
Fig. 2 shows a cross-sectional elevation on plane 2—2 of Fig. 1.
Figure 3:
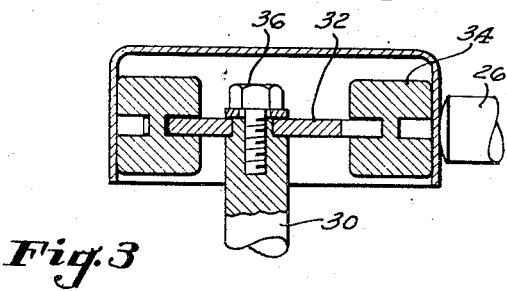
Fig. 3 shows a modified form of my invention.

In Fig. 3 the disc 32 takes the place of the element 12 of Figs. 1 and 2 and is bolted to the squared end of the shaft 30 by the cap screw 36.

If the eccentricity is small the centrifugal force increases rapidly as this eccentricity increases.

What I claim is:

1. A centrifugal governor comprising a rotating shaft, a cage rigidly connected to said shaft and consisting of two discs spaced apart, a plurality of radial slots in each of said discs, a plurality of cylindrical pivoted rollers confined between said discs and guided by said slots, a second cage surrounding said rollers and engaged thereby, said second cage being initially located eccentrically with reference to said rotating shaft, a guide for said second cage permitting said second cage to move radially with reference to said rotating shaft, yieldable means for opposing the motion of said second cage under the resultant centrifugal force of said rollers.

2. A centrifugal governor comprising a rotating shaft, a rotating disc connected thereto, a plurality of radial slots therein, a plurality of rollers each having a pivot, said pivot slidably engaging with one of said slots, a cage surrounding said rollers and engaged thereby, said cage being initially located eccentrically with reference to said rotating shaft, a guide for said cage permitting said cage to move radially with reference to said rotating shaft that will increase the eccentricity of the path of the rotating rollers at high speed, yieldable means adapted to oppose said motion.

EDWARD J. DUZY.

REFERENCES CITED

The following references are of record in the file of this patent:

UNITED STATES PATENTS

| Number | Name | Date |
|---|---|---|
| 1,154,094 | Cassard | Sept. 21, 1915 |
| 2,474,324 | Ray | June 28, 1949 |

FOREIGN PATENTS

| Number | Country | Date |
|---|---|---|
| 700,521 | France | Dec. 23, 1930 |